Figure 6:
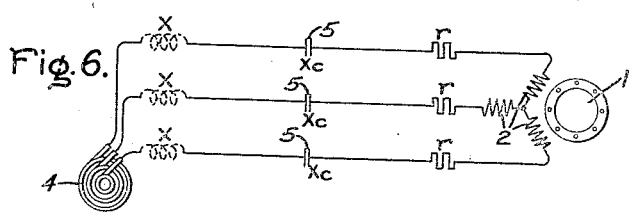

Feb. 28, 1939.                R. C. BUELL ET AL                 2,149,082
                                ELECTRIC CIRCUIT
                              Filed Oct. 29, 1937              3 Sheets-Sheet 1
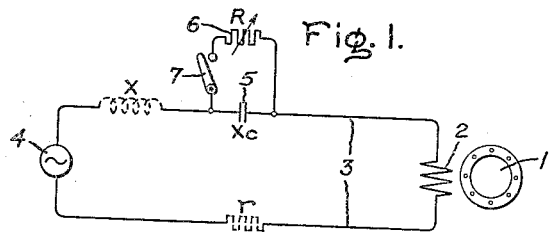
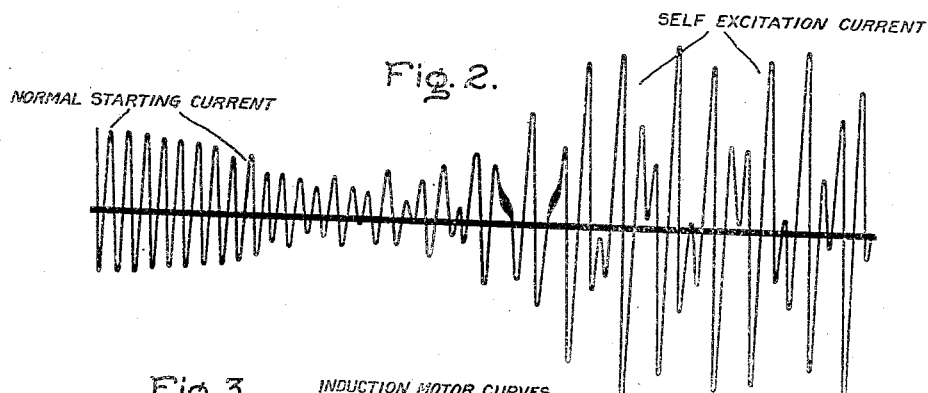
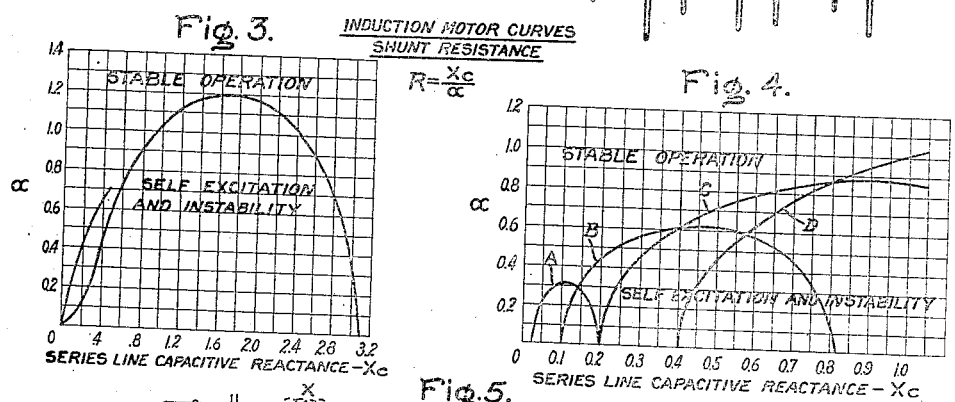
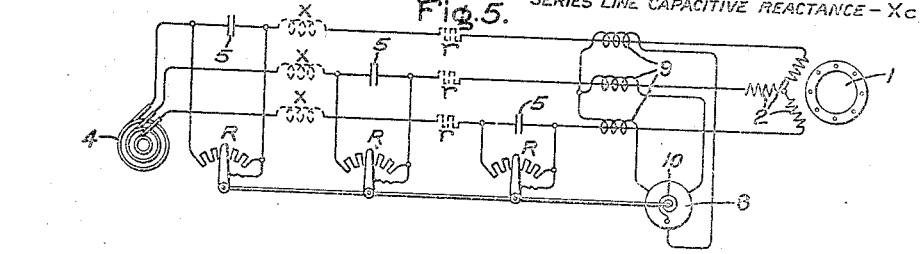
Inventors:
Roy C. Buell,
Selden B. Crary,
John W. Butler,
Charles Concordia,
by Harry E. Dunham
Their Attorney.

Feb. 28, 1939.    R. C. BUELL ET AL    2,149,082
ELECTRIC CIRCUIT
Filed Oct. 29, 1937    3 Sheets-Sheet 2

INDUCTION MOTOR CURVES
SERIES RESISTANCE $R = \dfrac{X_c}{\alpha}$

SYNCHRONOUS MACHINE
SHUNT RESISTANCE

Inventors:
Roy C. Buell,
Selden B. Crary,
John W. Butler,
Charles Concordia,
by Harry E. Dunham
Their Attorney.

Inventors:
Roy C. Buell,
Selden B. Crary,
John W. Butler,
Charles Concordia,
by Harry E. Dunham
Their Attorney.

Patented Feb. 28, 1939

2,149,082

UNITED STATES PATENT OFFICE

2,149,082

ELECTRIC CIRCUIT

Roy C. Buell, Selden B. Crary, John W. Butler, and Charles Concordia, Schenectady, N. Y., assignors to General Electric Company, a corporation of New York Application October 29, 1937, Serial No. 171,630

16 Claims. (Cl. 172—237)

This invention relates to electric circuits and more particularly to alternating current electric circuits containing dynamo-electric machines and substantial amounts of capacitive reactance.

One such circuit is a power line, containing a series capacitor, which feeds an induction motor. Another such circuit is a long unloaded transmission line, having a substantial amount of distributed shunt capacitance, which is charged by a synchronous generator. Other circuits in this general category will occur to those skilled in the art. It has been found by experience that most, if not all, of these circuits are subject to the occurrence of an objectionable phenomenon which for want of a better generic name will be referred to as self-excitation.

Self-excitation of induction motors fed by power lines containing series capacitors is characterized by currents of very irregular wave shape and abnormally high magnitude. In many instances the magnitude of the current exceeds the normal starting current of the motor and the frequency, if such an irregular current can be said to have a frequency, is quite different from the normal frequency of the circuit. Occasionally this abnormal self-excitation frequency will combine with the normal frequency to produce a relatively very low beat frequency and in one instance where a saw mill was operated by large induction motors fed from a sixty cycle power line containing a series capacitor, all of the lights in a town several miles away, which was fed by the same power line, flickered violently at a frequency of between three and five cycles per second.

As the term is herein employed, a series capacitor is an electrostatic condenser connected in series in a power line for the purpose of substantially neutralizing the distributed series inductance of the line. This reduces the overall reactance of the line thereby improving its voltage regulation and increasing the power limits of a synchronous to synchronous system interconnected by the line.

Self-excitation of a synchronous machine connected to a capacitive load, as when a synchronous generator charges a long transmission line, is characterized by loss of voltage control by the machine and attendant excessively high voltages as well as by the production of abnormal self-excitation currents.

In accordance with this invention, self-excitation is suppressed by the connection of a proper amount of resistance in or to this circuit. This resistance may either be connected in shunt to the capacitive reactance of the circuit or may be connected in series in the circuit, or some resistance connected in both ways may be used. Furthermore, the exact amount of resistance necessary to suppress self-excitation can be determined from formulae developed for this purpose.

In the light of present knowledge of the subject, it is impossible to give an adequate physical description or word picture of self-excitation. All that can be said is that under certain conditions of load it is found in practice that there will exist undamped current pulsations in the circuit of apparently low frequency and large magnitude. These pulsations are considered to be caused by undamped or negatively damped (amplifying) free electrical oscillations. In order to determine whether a given electrical system is stable or unstable (self-excitation) the natural currents of the system are examined mathematically. The time variation of these natural currents is specified by the roots of the characteristic determinant of the system. It has been found that if the real part of any one or more of these roots is positive the system is unstable and is subject to self-excitation since then the corresponding component of the transient current is amplifying rather than decaying and will tend to increase indefinitely until limited by changes in the circuit caused by saturation, slowing down or oscillation of the dynamo-electric machine rotor. In order, therefore, to determine the boundaries of self-excitation it is not necessary to solve the characteristic differential equation. All that is necessary is that the sign of the real parts of the complex roots be determined. As the complete mathematical theory and derivation of the formulae used herein appears in section 3 and the appendix of a paper entitled "Analysis of Series Capacitor Application Problems" by J. W. Butler and C. Concordia published on pages 975 to 988 of the August 1937 issue of "Electrical Engineering", and as this theory and derivation is long and complex it will not be repeated in its entirety here.

An object of the invention is to provide a new and improved alternating current electric power circuit.

Another object of the invention is to provide simple, reliable and inexpensive means for suppressing self-excitation and instability in alternating current power circuits containing dynamo-electric machines and substantial amounts of capacitive reactance.

Another object of the invention is to provide simple and economical means for suppressing self-excitation of induction motors fed by power lines containing series capacitors.

A still further object of the invention is to provide novel, simple and reliable means for increasing the line charging capacity of synchronous generators.

The invention will be better understood from the following description taken in connection with the accompanying drawings and its scope will be pointed out in the appended claims.

Figure 7:
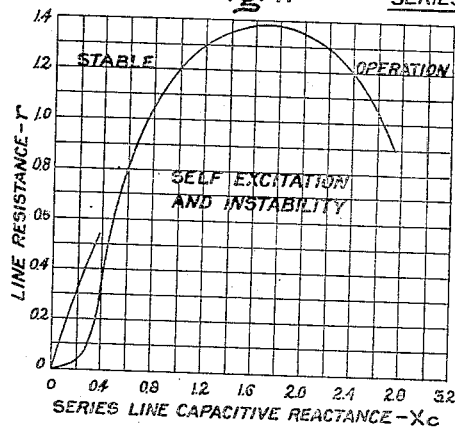
Figure 8:
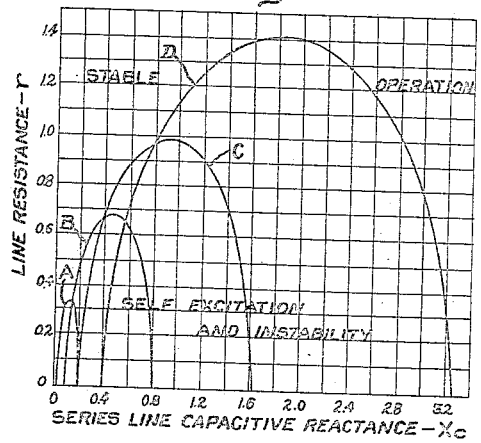
Figure 9:
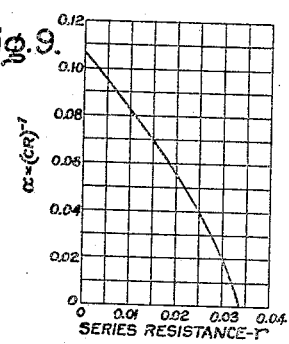
Figure 10:
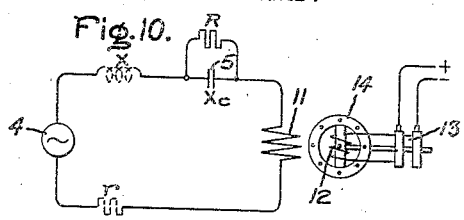
Figure 11:
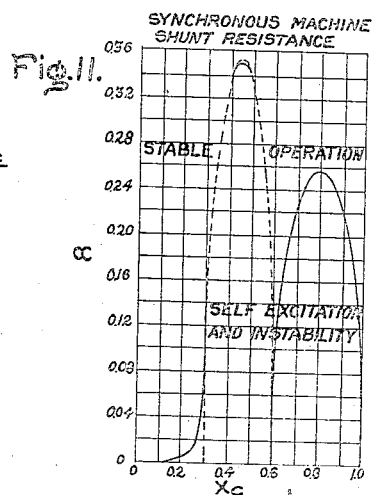
Figure 12:
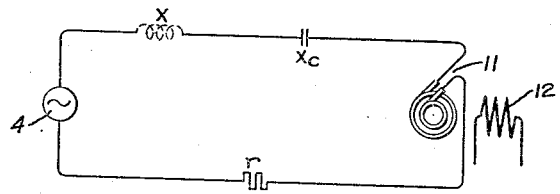
Figure 13:
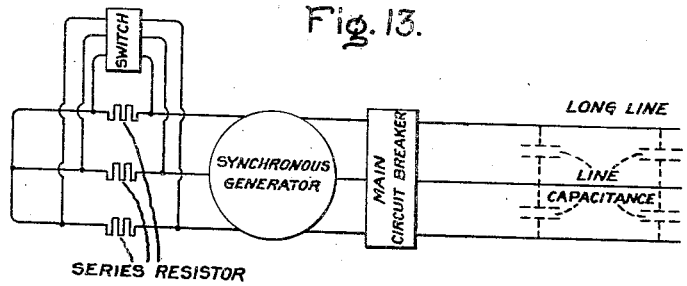
Figure 14:
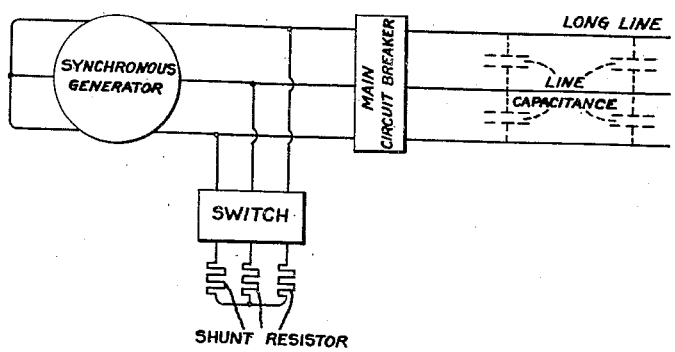

In the drawings, Fig. 1 is a diagrammatic showing of an elementary circuit containing a single phase induction motor fed by a circuit containing a series capacitor provided with a resistance in shunt therewith for suppressing self-excitation of the motor; Fig. 2 is an oscillograph of the normal starting current and the self-excitation current of the motor of Fig. 1 when no means for suppressing self-excitation is provided; Fig. 3 is a curve showing an example of the relation between series capacitance and resistance in shunt with the series capacitance which is necessary to produce stable operation and suppress self-excitation; Fig. 4 shows the effect on the curve of Fig. 3 of variations in motor speed; Fig. 5 is a three-phase circuit similar in principle to Fig. 1 but differing therefrom mainly in that it is provided with automatic means for regulating or controlling the value of the shunt resistance in accordance with an operating characteristic of the motor; Fig. 6 is an elementary three-phase circuit similar in principle to Fig. 1 but differing therefrom primarily in that series resistance is employed in suppressing self-excitation; Fig. 7 is a curve illustrating the relation between series capacitance and series resistance for suppressing self-excitation in Fig. 6; Fig. 8 shows the effect of variations in motor speed on Fig. 7; Fig. 9 shows the relation between series and shunt resistance necessary to suppress self-excitation in circuits having different amounts of series capacitance; Fig. 10 is an elementary diagrammatic showing of a single-phase circuit in which self-excitation of a synchronous dynamo-electric machine is suppressed by a resistor in shunt with a series capacitor in the power circuit feeding the motor; Fig. 11 corresponds to Figs. 3 and 7 except that it shows the relation between series capacitive reactance and shunt resistance for suppressing self-excitation of a synchronous motor rather than an induction motor; Fig. 12 differs from Fig. 10 in that a series resistance rather than a shunt resistance is used for suppressing self-excitation; Fig. 13 shows a three-phase circuit in which series resistors are used to increase the line charging capacity of a synchronous generator; Fig. 14 is similar to Fig. 13 except that a shunt resistor is used for increasing the line charging capacity of a synchronous generator.

Referring now to the drawings and more particularly to Fig. 1, the circuit shown therein comprises an induction motor having a squirrel cage rotor 1 and a stator winding 2 connected to receive energy from a power line 3. Line 3 is in turn energized by any suitable source of alternating current shown schematically at 4. Line 3 contains distributed inductance and resistance shown by the dotted coil and resistance symbols designated by $x$ and $r$ respectively. In order to improve the voltage regulation of the circuit a series capacitor 5 having a capacitive reactance $x_c$ substantially equal to the reactance $x$ of the circuit is connected therein.

As previously mentioned, such a circuit is subject to instability caused by self-excitation of the induction motor.

In Fig. 2 is shown an oscillograph of the motor current. At the left the current is the normal starting current of the motor which although relatively high in magnitude compared with the normal running current of the motor is of the rated frequency of the circuit, typically 60 cycles per second. This current gradually dies down as the motor comes up to speed and it will be noted that at a certain point irregular oscillations begin to occur and that these oscillations build up into currents of relatively great magnitude; as shown they are typically twice the normal starting current of the motor. These abnormal self-excitation currents have a different frequency from the normal frequency of the supply line and are typically lower in frequency although they may be equal to or higher than normal frequency.

By connecting a resistor R in shunt with the series capacitor by means of any suitable connections such for example as a switch 7 and by adjusting the resistor to the proper value, self-excitation may be entirely suppressed.

The critical value of R is that which when substituted in the following equation will make the real parts of all of the complex "$p$" roots negative or at most equal to zero. If the sign of any real part is positive, the system is unstable and excitation occurs while if all the signs are negative the system is stable. The equation is as follows:

$$[x'T_o]p^3 + [(x + \alpha x'T_o + rT_o) + j\omega 2x'T_o]p^2 + [(x_cT_o - \omega^2 x'T_o + \alpha x + r + \alpha rT_o) + j\omega(2x + \alpha x'T_o + rT_o)]p + [(x_c - \omega^2 x) + j\omega(\alpha x + r)] = 0 \quad (1)$$

wherein $p$ is the operator $d/dt$, $T_o$ is the time constant of the motor rotor with its stator open-circuited, $x'$ is the direct or quadrature axis transient reactance per phase of the motor including line reactance, $x$ differs from $x'$ in that it is for synchronous reactance, $x_c$ is the line series capacitive reactance, $\alpha$ is $x_c/R$, $r$ is stator and line resistance per phase and $\omega$ is the rotor speed.

This equation is derived in the paper referred to above and is based upon the natural constants of the circuit.

It is unnecessary actually to solve the above equation in order to find the signs of the real parts of the "$p$" roots. By means of Routh's Criterion these signs can be determined directly by making certain determinant like arrangements of the coefficients of "$p$" in the equation. For example, if the complex coefficient of $p^2$ in the above equation is negative the real parts of one of the roots of the equation will be positive and the circuit will be unstable. However, if the sign of the coefficient of $p^2$ is positive further tests must be made with the other coefficients of $p$ and $p^3$ to determine whether or not the real parts of any one of the other roots is positive. Routh's Criterion is explained on page 168 of E. J. Routh's textbook entitled "Advanced Rigid Dynamics" published by Macmillan & Company in 1884.

In Fig. 3 a curve has been plotted from which can be determined the critical value of R necessary to prevent self-excitation for any value of series capacitance $x_c$. The area under this curve represents the region of self-excitation and instability and the area above the curve represents the region of stable operation. The numerical values shown in Fig. 3 and all numerical values used herein are on what is known as a per unit basis. The term "per unit" is employed as a convenient characterization of the method of designation by which quantities are expressed as a decimal fraction of a normal or unit value. The method is analogous to the method of percentage representation of quantities except that the factor 100 is omitted. The advantage of the method is that the factor 100 does not have to be multiplied in or divided out whenever the operations of division of multiplication are performed. The normal quantities here involved are primarily derived from the name-plate rating of the dynamo-electric machine. For example, rated frequency of the induction motor is termed unit frequency, rated voltage becomes unit voltage, rated full load current becomes unit current, the ratio of rated voltage to rated full load current becomes unit impedance, etc.

Fig. 3 is based on a motor having a time constant $T_0$ of 171.4 per unit, a transient reactance $x'$ of .4, a synchronous reactance $x$ of 3.24, a rotor speed of .975 and a series resistance so low as to be negligible. These values were inserted in Equation (1) above, different values were assigned to $x_c$ and then trial and error tests for different values of R were made until a value of R was obtained which was critical: that is to say, which would cause a change in sign of the real part of at least one of the "$p$" roots when R was increased or decreased. In this way successive points on the curve were located. The incompleted curve in Fig. 3 differs from the completed curve in that external rotor resistance was added to bring up the total resistance to 10 times the resistance for the completed curve. In other words, the time constant $T_0$, which is the ratio L/R for the rotor winding circuit, is 17.14 for the incompleted curve and 171.4 for the completed curve.

As it is more convenient to employ the term $\alpha$ in the equation than it is to employ $x_c$ and R separately, Fig. 3 gives the values of R in terms of $\alpha$ corresponding to various values of $x_c$. The value of R is easily obtained by remembering that R equals $x_c/\alpha$.

For ordinary cases of series capacitor applications, the most useful part of the curve in Fig. 3 is near the origin of coordinates. Thus the reactance of most power circuits feeding an induction motor is of the order of .2 the normal impedance of the motor, and consequently the reactance of the series capacitor for neutralizing the line reactance will have a value of about .2. In Fig. 3 the maximum value of R for securing stable operation with a series capacitive reactance having a value of .2 will be .2/.1 or about 2. This means that the maximum value of shunt resistance in ohms is about twice the impedance of the motor.

In Fig. 4 is shown the effect of variations in motor speed on the critical value of R. Curve A is for quarter speed or .25 unit speed, curve B is for .5 unit speed, curve C is for .707 per unit speed and curve D is for unit speed.

In Fig. 5 the power circuit is essentially the same as that shown in Fig. 1 and differs therefrom only in that it is a three-phase circuit instead of a single-phase circuit. However, automatic means is provided for regulating or adjusting the value of the shunt resistance R. As will be seen from Fig. 4 for any particular value of $x_c$ the values of motor speed correspond with different minimum values of $\alpha$ necessary to secure stable operation. Consequently, the best value of R, which is a function of $\alpha$, will vary with different speeds to the motor.

One way of securing this result automatically is to make each of the capacitor shunting resistances in Fig. 5 adjustable rheostats and have them controlled simultaneously in response to a function of motor speed. This means is shown in the Fig. 5 as a torque motor 8 connected to respond to the current draw by the motor, which current of course varies as the speed or load of the motor varies, by means of current transformers 9. The torque of the torque motor 8 is balanced against a spiral spring 10 and the entire arrangement can be so adjusted that the changes in current through the motor accompanying changes in speed thereof will so vary the torque of the torque motor 8 as to change the settings of the capacitor shunting rheostat in order to obtain the best value of resistance for each speed.

In Fig. 6 the shunt resistors are dispensed with and self-excitation is suppressed entirely by inserting the proper amount of series resistance $r$ in the circuit.

The proper value of series resistance is obtained from the previously given formula or Equation (1). However, the determination of the proper series resistance is somewhat easier than the determination of the proper shunt resistance because the elimination of shunt resistance is equivalent to making the shunt resistance have a value of infinity so that $\alpha$ becomes 0 and all terms containing $\alpha$ vanish from the equation.

Figs. 7 and 8 show the proper values of $r$ for different values of series capacitance $x_c$ for the same motor upon which Figs. 3 and 4 are based. In other words, Figs. 7 and 8 correspond respectively to Figs. 3 and 4 except that Figs. 7 and 8 are in terms of series resistance $r$ whereas Figs. 3 and 4 are in terms of shunt resistance R.

In Fig. 9 is shown the relation between $\alpha$ or shunt resistance and series resistance. The curve is almost a straight line showing that the relation between these two resistors is substantially a linear one and from this curve it is easy to find either one of the resistances when the other one is known.

It is to be noted that the formula which has been given above is generic in the sense that it covers the case of both series and shunt resistance for suppressing self-excitation of induction motors. The curves shown in Figs. 3 and 7 represent solutions of special cases under this general equation in that the curve of Fig. 3 takes into account only shunt resistance and assumes the series resistance to be 0, whereas the curve of Fig. 7 takes into account only series resistance and assumes the shunt resistance to be infinite. Obviously, however, many actual circuits will have appreciable series resistance but from the standpoint of losses, it may not be desirable to secure entire suppression of self-excitation by adding more series resistance to the already present series resistance. In such cases, shunt resistance may be employed to supplement the already present series resistance. However, by the formula given above, the correct value of shunt resistance which needs to be added can readily be determined by inserting in the formula the value of series resistance $r$ which has to be present.

The above curves have been checked by actual measurements on a machine and the test data agrees very closely with the calculated curves.

Self-excitation also occurs in synchronous machines connected to power lines containing series capacitors and in Fig. 10 there is shown a circuit generally similar to Fig. 1 except that a synchronous motor has been substituted for the induction motor. This motor comprises an armature winding 11, a field winding 12, supplied with direct current through slip rings 13, and an amortisseur winding 14.

The previously given equation or Formula (1) can be extended so as to include alternating current dynamo-electric machines having at least two rotor windings and thus will cover not only an induction motor but a synchronous motor having a field winding and an amortisseur winding. This equation is as follows:

$$[(p+\alpha)^2+\omega^2](p^2+\omega^2) \text{ times } [p^2(x_{ad}x_{fd}x_{ld}-x_{ad}x_{fld}^2-x_{fd}x_{ald}^2-x_{ld}x_{afd}^2+2x_{afd}x_{ald}x_{fld})+p\{(x_{ad}x_{ld}-x_{ald}^2)r_{fd}+(x_{ad}x_{fd}-x_{afd}^2)r_{ld}\}+x_{ad}r_{ld}r_{fd}] \text{ times } [p(x_{aq}x_{lq}-x_{alq}^2)+x_{aq}r_{lq}]+\{[(p+\alpha)^2+\omega^2]r_ap+x_c[p(p+\alpha)-\omega^2]\} \text{ times }$$
$$[[p(x_{aq}x_{lq}-x_{alq}^2)+x_{aq}r_{lq}][p^2(x_{lq}x_{fd}-x_{fld}^2)+p(x_{ld}r_{fd}+x_{fd}r_{ld})+r_{ld}r_{fd}]+[p^2(x_{ad}x_{fd}x_{ld}-x_{ad}x_{fld}^2-x_{ld}x_{afd}^2-x_{fd}x_{ald}^2+2x_{afd}x_{fld}x_{ald})+p\{(x_{ad}x_{ld}-x_{ald}^2)r_{fd}+(x_{ad}x_{fd}-x_{afd}^2)r_{ld}\}+x_{ad}r_{ld}r_{fd}](px_{lq}+r_{lq})]+\{[(p+\alpha)^2+\omega^2]r_a^2+2r_ax_c(p+\alpha)+x_c^2\} \text{ times } [p^2(x_{fd}x_{ld}-x_{fld}^2)+p(x_{ld}r_{fd}+x_{fd}r_{ld})+r_{ld}r_{fd}](px_{lq}+r_{lq})=0 \quad (2)$$

wherein $p=d/dt$
$\omega$=angular speed of machine rotor
$x$=reactance
$r$=resistance
Subscript $d$ means direct axis
Subscript $q$ means quadrature axis
Subscript $a$ means armature winding
Subscript $f$ means field winding
Subscript $l$ means amortisseur winding
Subscript $c$ means capacitive
$R$=resistance in shunt with capacitance
$\alpha=x_c/R$ Example: $x_{ald}$=Direct axis mutual reactance between the armature and amortisseur windings.

In this equation the coefficients of the "$p$" terms have not been collected, but it will be noted that the first term will contain a "$p$" term to the seventh power. By substituting the proper values in this equation and using Routh's Criterion for determining the signs of the real parts of the complex "$p$" roots the proper values of $r$, or $R$, or both, necessary to determine stability of either an induction motor or a synchronous motor having two rotor windings may be determined.

By making certain simplifying assumptions, as for example by assuming that the synchronous motor has but one rotor winding and that there is no series resistance, the equation for part of the self-excitation region of a synchronous motor may be reduced to $$R=\frac{x_c}{\sqrt{\frac{(x_q-x_c)(x_d-x_c)}{-x_qx_d}}}$$

where $x_d$ and $x_q$ are the direct and quadrature axis synchronous reactances respectively of the rotor winding of the synchronous machine and $x_c$ is the reactance of the series capacitor. This equation only holds true for that part of the self-excitation region where $x_c$ is greater than $x_q$ and less than $x_d$.

Fig. 11 is a curve for such a synchronous machine showing the relation between $\alpha$ and $x_c$.

In Fig. 12 self-excitation of a synchronous motor is suppressed by means of a series resistor $r$ and no shunt resistor is connected across the capacitor.

The value of series resistance $r$ necessary to suppress self-excitation of the synchronous machine can be determined from the generic equation given above.

Another aspect of this invention is that of the line charging capacity of synchronous generators. The conductors of a long transmission line represent a capacitor and when the receiving end of such a line is open and a generator is connected to the sending end the shunt distributed capacitance of the line acts very much as though the generator were connected to a circuit containing a series capacitor. Analytically the circuits are similar. The longer such a line is, the greater its shunt capacitance is, and the lower its capacitive reactance becomes. It has been known for a long time that when the capacitive reactance of the line equals the inductive reactance of the synchronous machine that instability and loss of voltage control occur.

As will be seen from the curve in Fig. 11, this is really another aspect of self-excitation. Thus, when $x_c$ has a value of unity, which is another way of saying when it has a value equal to the reactance of the synchronous machine, instability occurs. For all transmission lines short of this critical value, the value of $x_c$ is greater than 1 and stable operation results. Thus, line charging capacity problems represent self-excitation conditions at the right-hand end of the curve of Fig. 11 whereas ordinary series capacitor arrangements, wherein a series capacitor is inserted for voltage regulation and stability purposes, is covered by the left-hand end of the curve of Fig. 11.

By inserting the proper amount of series resistance, as in Fig. 13, or shunt resistance, as in Fig. 14, the line charging capacity of the synchronous generator may be very materially increased as can readily be seen from Fig. 11 and by using the proper amount of resistance a generator may be made to charge a line of any length in a stable manner.

It is interesting to note in Fig. 11 that there is a point corresponding to a value of capacitance $x_c=.6$ at which $\alpha$ is very low or in other words at which the shunt resistance required for stability will be very high and at this point, of course, very low losses will occur in the resistor.

The values of series and shunt resistance for increasing the line charging capacity of a synchronous generator may be calculated and tested for in the same manner as has already been described in connection with the ordinary series capacitor circuit.

While there are shown and described herein various embodiments of the invention, it will be obvious to those skilled in the art that changes and modifications may be made therein without departing from the invention and, therefore, it is aimed in the appended claims to cover all changes and modifications as fall within the true spirit and scope of this invention.

What we claim as new and desire to secure by Letters Patent of the United States, is:

1. In an electric power system, an alternating current dynamo-electric machine having a rotor and a stator winding adapted to carry current of a predetermined maximum safe value at a predetermined normal frequency and maximum safe voltage, an electric circuit connected to said stator winding, said circuit containing capacitance of such value as to cause self-excitation of said machine and the production thereby of abnormal frequency and magnitude current and voltage oscillations, and resistance inserted in said circuit for suppressing self-excitation of said machine, said resistance being partly series resistance of such value $r$ and partly capacitance shunting resistance of such value $R$ as to make negative the real parts of all the complex "$p$" roots of the equation $$[(p+\alpha)^2+\omega^2](p^2+\omega^2) \text{ times } [p^2(x_{ad}x_{fd}x_{ld}-x_{ad}x_{fd}^2-x_{fd}x_{ald}^2-x_{ld}x_{afd}^2+2x_{afd}x_{ald}x_{fld})+p\{(x_{ad}x_{ld}-x_{ald}^2)r_{fd}+(x_{ad}x_{fd}-x_{afd}^2)r_{ld}\}+x_{ad}r_{ld}r_{fd}] \text{ times } [p(x_{aq}x_{lq}-x_{alq}^2)+x_{aq}r_{lq}]+\{[(p+\alpha)^2+\omega^2]r_ap+x_c[p(p+\alpha)-\omega^2]\} \text{ times } [[p(x_{aq}x_{lq}-x_{alq}^2)+x_{aq}r_{lq}][p^2(x_{lq}x_{fd}-x_{fld}^2)+p(x_{ld}r_{fd}+x_{fd}r_{ld})+r_{ld}r_{fd}]+[p^2(x_{ad}x_{fd}x_{ld}-x_{ad}x_{ald}^2-x_{ld}x_{afd}^2-x_{fd}x_{ald}^2+2x_{afd}x_{fld}x_{ald})+p\{(x_{ad}x_{ld}-x_{ald}^2)r_{fd}+(x_{ad}x_{fd}-x_{afd}^2)r_{ld}\}+x_{ad}r_{ld}r_{fd}](px_{lq}+r_{lq})]+\{[(p+\alpha)^2+\omega^2]r_a^2+2r_\alpha x_c(p+\alpha)+x_c^2\} \text{ times } [p^2(x_{fd}x_{ld}-x_{fld}^2)+p(x_{ld}r_{fd}+x_{fd}r_{ld})+r_{ld}r_{fd}](px_{lq}+r_{lq})=0$$

wherein $p=d/dt$
$\omega$ = angular speed of machine rotor
$x$ = reactance
$r$ = resistance
Subscript $d$ means direct axis
Subscript $q$ means quadrature axis
Subscript $a$ means armature winding
Subscript $f$ means field winding
Subscript $l$ means amortisseur winding
Subscript $c$ means capacitive
R = resistance in shunt with capacitance
$\alpha = x_c/R$.

2. In an electric power system, an alternating current dynamo-electric machine having a rotor and a stator winding adapted to carry current of a predetermined maximum safe value at a predetermined frequency and maximum safe voltage, an electric circuit connected to said stator winding, said circuit containing capacitance of such value as to cause said machine to self-excite and produce amplifying abnormal magnitude current oscillations of abnormal frequency, and means for suppressing said self-excitation phenomenon comprising a resistor whose value is correlated to the constants of said circuit and said machine connected to said circuit.

3. In a system of electrical transmission and distribution, an alternating current power line, a series capacitor connected therein for improving the voltage regulation thereof, an asynchronous dynamo-electric machine connected to be energized by said line, and resistance of predetermined magnitude connected in such relation to said line as to suppress self-excitation of said machine caused by the presence of said capacitor, the value of said resistance being such as to cause to be negative the real parts of all the "$p$" roots of the equation $$[x'T_o]p^3+[(x+\alpha x'T_o+rT_o)+j\omega 2x'T_o]p^2+[(x_cT_o-\omega^2 x'T_o+\alpha x+r+\alpha rT_o)+j\omega(2x+\alpha x'T_o+rT_o)]p+[(x_c-\omega^2 x)+j\omega(\alpha x+r)]=0$$

wherein $x'$ is the direct or quadrature axis transient reactance per phase of the machine including line reactance,
$T_o$ is the rotor time constant with open-circuited stator of the machine,
$p$ is the operator $d/dt$,
$x$ is the direct or quadrature axis synchronous reactance per phase of the machine including line reactance,
$\alpha$ is the reactance per phase ($x_c$) of the series capacitor divided by the value per phase ($R$) of a resistor, if any, shunting said capacitor, $r$ is the stator and line resistance per phase, and
$\omega$ is the rotor speed.

4. In a system of electrical transmission and distribution, an alternating current power line, a series capacitor connected therein for improving the voltage regulation thereof, an induction motor connected to be energized through said capacitor by said line, and a resistor for suppressing self-excitation of said motor connected in shunt to said capacitor, said shunt resistor having such a value R as to make negative the real parts of all the complex "$p$" roots of the equation $$[x'T_o]p^3+[(x+\alpha x'T_o+rT_o)+j\omega 2x'T_o]p^2+[(x_cT_o-\omega^2 x'T_o+\alpha x+r+\alpha rT_o)+j\omega(2x+\alpha x'T_o+rT_o)]p+[(x_c-\omega^2 x)+j\omega(\alpha x+r)]=0$$

wherein $p$ is the operator $d/dt$
$T_o$ is the time constant of the motor rotor with its stator open-circuited,
$x'$ is the direct or quadrature axis transient reactance per phase of the motor including line reactance.
$x$ differs from $x'$ in that it is for synchronous reactance,
$x_c$ is the line series capacitive reactance,
$\alpha$ is $x_c/R$,
$r$ is stator and line resistance per phase and
$\omega$ is the rotor speed.

5. In a system of electrical transmission and distribution, an alternating current generator, an induction motor, a power circuit having an objectionable amount of inductance connected between said generator and said motor, a series capacitor in said circuit for substantially neutralizing said inductance, said capacitor so changing the constants of the entire circuit as to permit the building up to objectionably high values of lower than normal frequency current generated by self-excitation in said motor, and a resistor connected in shunt with said capacitor, said resistor having a value low enough to prevent the building up of said current and having a value high enough substantially to maintain the capacitive effect of said capacitor.

6. In a system of electrical transmission and distribution, an alternating current generator, an induction motor, a power circuit interconnecting said generator and said motor, a series capacitor in said circuit, a variable resistor connected in shunt with said capacitor, and means responsive to an operating condition of said motor for varying the value of said resistor.

7. In a system of electrical transmission and distribution, an alternating current generator, an induction motor, a power circuit interconnecting said generator and said motor, a series capacitor in said circuit, a variable resistor connected in shunt with said capacitor, and means responsive to the current in said circuit for varying the value of said resistor.

8. In a system of electrical transmission and distribution, an alternating current power line having a substantial amount of capacitance, a synchronous machine connected thereto, and a resistor connected in shunt to the capacitance of said circuit for preventing self-excitation of said machine, said resistor having a value R at least as small as that determined by the equation $$R = \frac{x_c}{\sqrt{\frac{(x_q - x_c)(x_d - x_c)}{-x_q x_d}}}$$

wherein $x_d$ and $x_q$ are the direct and quadrature synchronous reactances respectively of said synchronous machine, and $x_c$ is the capacitive reactance of the line.

9. In a system of electrical transmission and distribution, an alternating current power line having a relatively low resistance, a series capacitor connected in said line, a synchronous dynamo-electric machine connected to said line, and a resistor connected in shunt with said series capacitor for preventing self-excitation of said machine, said resistor having a value R less than $$\frac{x_c}{\sqrt{\frac{(x_q - x_c)(x_d - x_c)}{-x_q x_d}}}$$

wherein $x_d$ and $x_q$ are the direct and quadrature synchronous reactances respectively of the rotor winding of said synchronous machine, and $x_c$ is the reactance of said series capacitor.

10. In a system of electrical transmission and distribution, an unloaded power line, a synchronous generator for charging said line, said line having a distributed shunt capacitive reactance which is lower than the effective synchronous reactance of said generator and power line, and a resistor connected to said line and so correlated to the constants of said line and said generator as to produce stability of voltage and eliminate self-excitation of said generator.

11. In a system of electrical transmission and distribution, an unloaded power line, a synchronous generator for charging said line, said line having a distributed shunt capacitive reactance which is lower than the synchronous reactance corresponding to the line charging capacity of said generator, and a resistor connected in shunt to said generator and line and so correlated to the constants of said line and said generator as to produce stability of voltage and eliminate self-excitation of said generator.

12. In a system of electrical transmission and distribution, a synchronous generator for charging a transmission line, and means for increasing the line charging capacity of said generator comprising a resistor connected in shunt with said generator and line, said resistor being so correlated to the constants of the generator and line to be charged that voltage control will be maintained when the shunt capacitive reactance of the line to be charged is exceeded by the effective synchronous reactance of the generator and transmission line.

13. In a system of electrical transmission and distribution, a synchronous generator for charging a transmission line, and means for increasing the line charging capacity of said generator comprising a resistor connected in circuit with the terminals of said generator, said resistor being so correlated to the constants of the generator and line to be charged that voltage control will be maintained when the shunt capacitive reactance of the line to be charged is exceeded by the synchronous reactance of the generator and transmission line.

14. In an electric power system, an asynchronous dynamo-electric machine having a stator winding, an electric circuit connected to said stator winding, a capacitor of such value as to cause the production of abnormally high self-excitation voltages by said machine connected in said circuit, and means for limiting the self-excitation voltage of said machine to a safe value comprising a resistor connected in shunt circuit relation with said capacitor.

15. In an electric power system, an asynchronous dynamo-electric machine having a stator winding, an electric circuit connected to the terminals of said stator winding, a capacitor of such value as to cause the production of abnormally high self-excitation voltages by said machine connected in said circuit, and means for limiting the self-excitation voltage of said machine to a safe value comprising resistance normally connected in series circuit relation with said capacitor.

16. In an electric power system, an asynchronous dynamo-electric machine having a stator winding, an electric circuit connected to the terminals of said winding, a capacitor of such value as to cause the production of abnormally high self-excitation voltages by said machine connected in said circuit, and means for limiting the self-excitation voltage of said machine to a safe value comprising a resistor connected in shunt circuit relation with said capacitor and resistance connected in series circuit relation with said capacitor.

ROY C. BUELL.
SELDEN B. CRARY.
JOHN W. BUTLER.
CHARLES CONCORDIA.